United States Patent [19]
Mermudez

[11] 3,797,432
[45] Mar. 19, 1974

[54] BOAT FOR STERN FISHING WITHOUT A RAMP WITH TWO DECKS

[76] Inventor: Javier Rey Mermudez, Avda-Primo de Rineo, 1-13°, La Coruna, Spain

[22] Filed: Aug. 16, 1972

[21] Appl. No.: 281,208

[30] Foreign Application Priority Data
Nov. 26, 1971 Spain .................................. 397399

[52] U.S. Cl. ............................................ 114/0.5 A
[51] Int. Cl. .......................................... B63b 35/00
[58] Field of Search ............ 114/0.5 A, 43.5, 65, 61

[56] References Cited
UNITED STATES PATENTS
| | | | |
|---|---|---|---|
| 3,070,916 | 1/1963 | Luketa | 114/0.5 A |
| 2,579,787 | 12/1951 | Burney | 114/0.5 A |

FOREIGN PATENTS OR APPLICATIONS
| | | | |
|---|---|---|---|
| 1,055,986 | 1/1956 | Germany | 114/0.5 A |
| 686,729 | 3/1965 | Italy | 114/0.5 A |
| 1,103,790 | 3/1961 | Germany | 114/0.5 A |

Primary Examiner—Trygve M. Blix
Assistant Examiner—Stuart M. Goldstein
Attorney, Agent, or Firm—Ralph Hohenfeldt; Fred Wiviott

[57] ABSTRACT

The subject of the present invention consists of a boat for fishing from the stern, without a ramp, with two decks, which represents something completely new and different in fishing boats for stern fishing as they are now known and used, and which, in spite of being of small tonnage, has the advantages of a large refrigerator ship.

11 Claims, 5 Drawing Figures

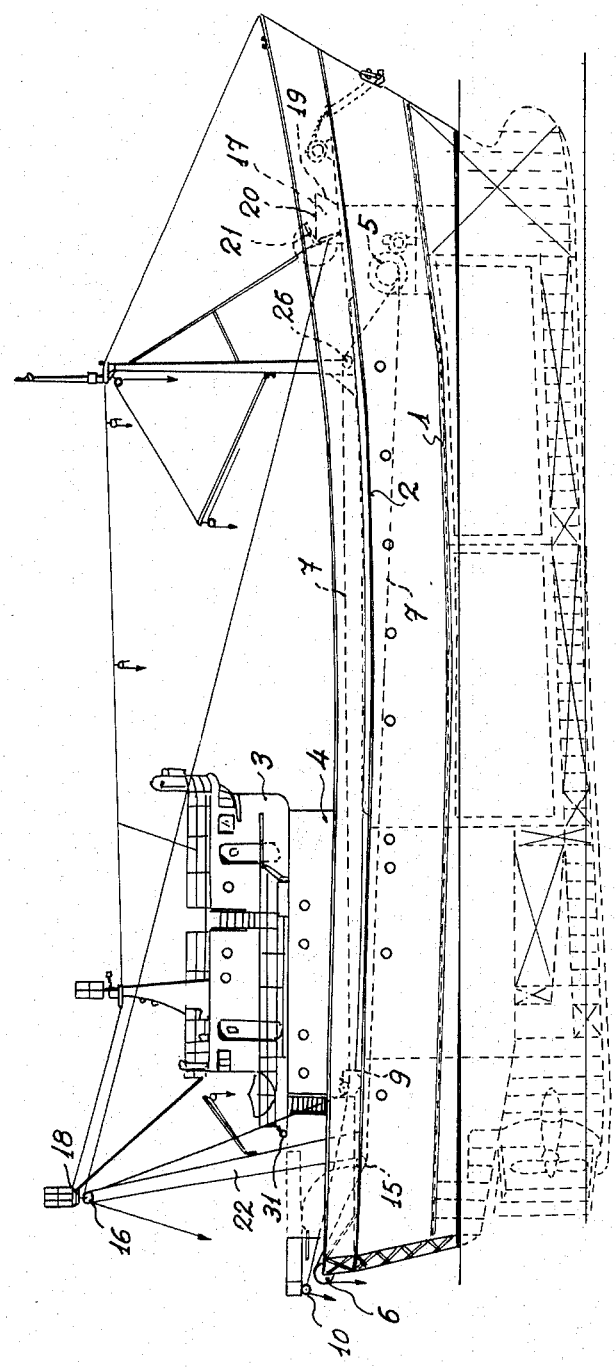

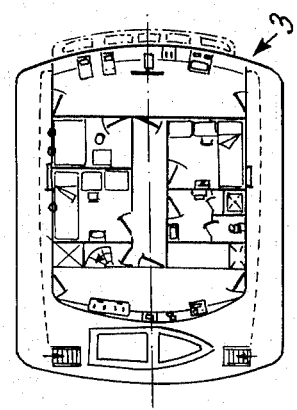
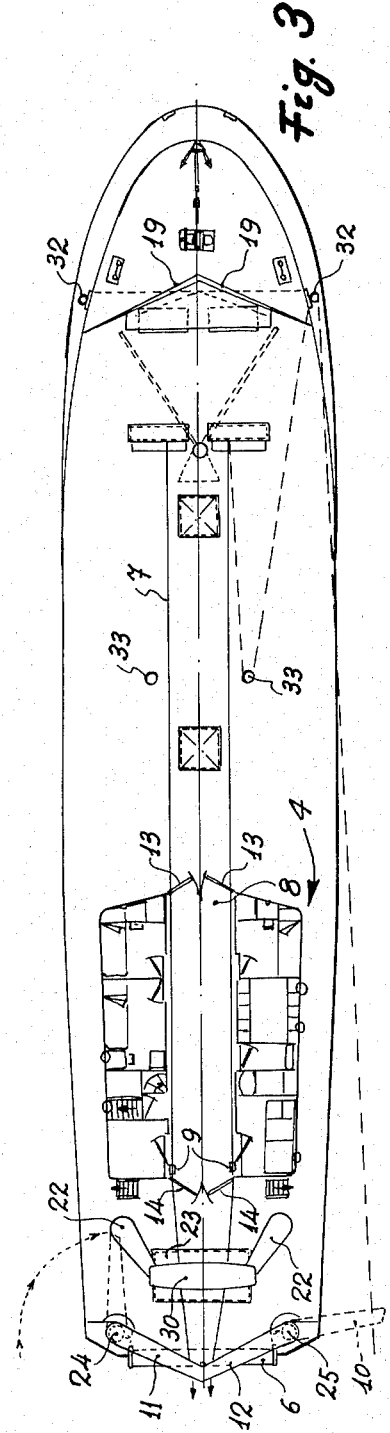

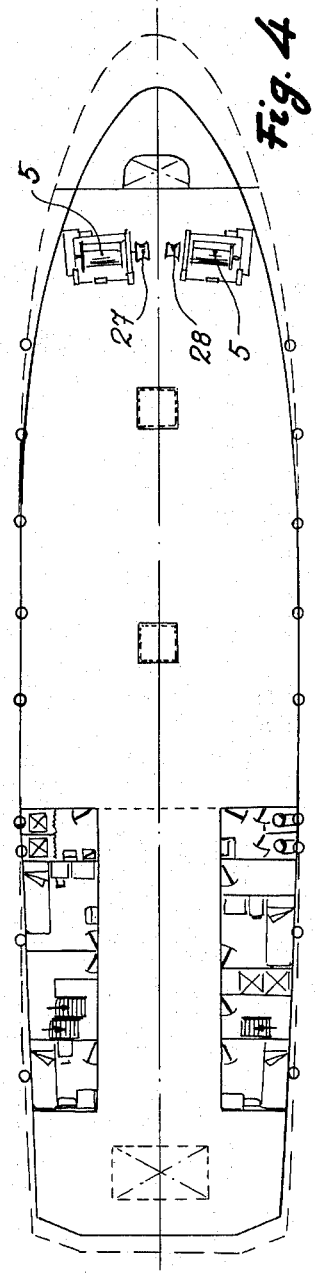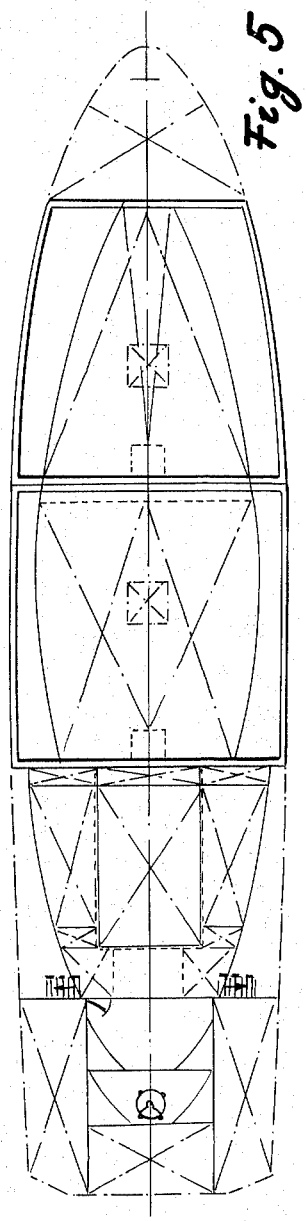

BOAT FOR STERN FISHING WITHOUT A RAMP WITH TWO DECKS

The purpose of this application for a Patent of Invention is to describe a boat for fishing from the stern, without a ramp, with two decks, which represents something completely new and different in fishing boats for stern fishing as they are now known and used, and which, in spite of being of small tonnage, has the advantages of large refrigerator ships.

Boats for stern fishing with ramps have been demonstrated to have serious drawbacks. One of these is the significant loss of ship capacity due to the spaced required for the ramp which, however small the boat may be, will take at least five metres from the length of the ship. In addition, there is serious danger to the crew from the ramp, since in bad weather waves enter through the open ramp and sweep over the deck and, even in the case of large refrigerator ships, may reach the bridge, a distance of some sixty metres. Therefore, if in a ship of this type in which the freeboard deck is very large, the water enters all the way to the bridge, the existence of such ramps in small boats would make work impossible as the ramp would allow flooding of the deck and some 25 or 30 tons of water would be loaded onto the surface of the ramp, a quantity with which the stern would be submerged and displacement would be lost.

Another drawback is that the winches for hoisting the fishing gear are located aft of the bridge, even though the bridge goes toward the bow. Therefore, in a small boat, the amount of gear that can be taken up is very small, and it is necessary to repeat the hoisting operation a considerable number of times before the fishing gear is hauled in completely.

Another drawback is that the sides of the boat are normally completely taken up by life boats. Thus, if it is necessary to run a cable from bow to stern or vice-versa, it must be done by raising the cable above the boats, with the consequent danger. In boats for stern fishing, when there is a snag (when the fishing gear fouls on the bottom of the sea), all of the operation of disentangling it must be conducted from the stern of the boat with the risk of the cables becoming entangled in the propeller blades.

It will be noted also that in traditional boats, when the fishing gear is being hoisted in, when the doors reach the stern, a few metres before coming to the davits, it is necessary to give warning of this fact with the release bar, striking three times on the gunwale to advise the person controlling the winches in order that he may reduce their speed, inasmuch as this operator cannot see directly what is going on. If the speed of the winches is not reduced, the arrival of the doors of the net at a point where they butt against the davit can break the cable and cause accidents, or even the loss of the entire fishing gear since the doors may fall into the sea if the net section of the other arm of the gear does not hold, and the entire gear may be lost.

All of these problems are resolved in the boat to which this application has reference, as the result of a series of maximum improvements introduced in the boat.

For example, for the throwing out and hauling in of the fishing gear by the stern, a ramp has been dispensed with and a revolving roller has been provided which simplifies the operation completely and with which, at the same time, extra metres of space are gained for the capacity of the boat.

In addition to this, the winches have been located forward, below the main deck, the operation of hauling in the fishing gear being conducted through a tunnel which is formed beneath the command bridge, so that, for example, in a boat with a keel length of 29 metres, it is possible to take in 25 metres of fishing gear at a time; that is to say, it is possible to haul in at one time as many metres of tackle as is permitted by the length of the boat from the roller at the stern to the forward mast, which is where the rollers are located by which the cables enter the winches, with the advantage that these are under cover, the sailor being completely protected from the surging sea and inclement weather.

It is current practice in vessels to have the sides of the boat occupied by the davits for the life boats. With this situation, when it is necessary to run a cable from one end of the boat to the other, whether during fishing operations or in mooring, it is necessary to perform dangerous manoeuvers on top of the davits. In the boat which is the subject of this invention, provision has been made to keep the sides of the boat free of obstructions, thus obtaining a greater simplicity in the operations to be carried out, including those of disentangling the fishing gear from the bottom when it is snagged, by carrying one of the cables forward to the bow through some of the rollers. After this step, the boat may carry out the work of disentangling the gear from the bow, eliminating the danger of the cable becoming caught in the propeller. This is an advantage which the boats with ramps for stern fishing do not have, and cannot have, but which can be achieved in boats of traditional design.

Still another advantage of this type of boat is that the person who is in charge of hauling in the fishing gear with the winches sees the operation directly, whether it is hauled in by the lower deck or the upper deck, and even when it is necessary to loop the gear to the two-legged mast aft. With this, when the gear reaches the end of the mast, the winches will stop without any need for a delay in order to be so advised.

All these improvements can be carried out in vessels of any kind, even though they may be of very small tonnage.

A clearer and more concrete idea of the boat which is the subject of this application is given in the attached sheets of drawings in which:

FIG. 1 is a side view of the boat.

FIG. 2 is an overhead plan view of the bridge.

FIG. 3 is an overhead plan view of the upper deck, where the fishing gear is put through the tunnel which is located under the bridge.

FIG. 4 is an overhead plan view of the freeboard or main deck.

And FIG. 5 is a view of the hatches.

This invention relates to a boat for stern fishing, without a ramp, which has a double deck and a double bridge, the lower bridge forming a tunnel which can be kept open or closed at will and through which the part of the stern where the operations of hoisting in the fishing tackle may be seen from the bow.

Referring first to FIG. 1, it can be seen that the boat includes a main or lower deck 1 and an upper deck 2, the first bridge or command bridge 3 and the lower bridge or working bridge 4.

In the same Figure, the placement of the fishing winches 5 may also be observed, located completely forward and oriented as shown in FIG. 4 below the upper deck, and the roller 6 located fully aft, on the side, by which the fishing gear is slid in. This roller will be driven by a motor, which is not shown in the drawings, and which will permit it to turn in both directions, thus facilitating both the setting out and the hauling in of the fishing tackle.

As we have indicated previously, the hoisting in of the gear can be done by the lower deck, by the upper deck, or by the upper deck but looped to the aft mast.

The hauling in on the lower deck would only be done in cases of bad weather. Under normal conditions, the hauling in would be carried out on the upper deck. For this manoeuver, the winches begin to pull the cables 7 which slide over the deck and reach the stern through the tunnel 8 which divides the working bridge in two halves 4. Inside this tunnel and at the exit to the stern, rollers have been provided 9 by means of which the cable will be slid and which, passing between the aft masts, slides through the snatch blocks 10 of the davits 11 and 12, -FIG. 3-.

The net (not shown) has the customary doors (not shown) ahead of it for spreading the net during trawling.

When the doors at the seaward end of the cables have reached the snatch blocks 10 a release bar (not shown) is inserted to attach the doors to the davit arms 11 and 12. This takes the strain off of the doors so the cable may be detached from the doors and attached to the net. In the following manoeuver, the davits 11 and 12 -FIG. 3- are swung on their vertical axes, each one towards on side of the boat, thus making it convenient to remove the doors so that they do not get in the way of pulling in the remaining tackle. The davits revolve on axes 24 and 25 driven by an electric or hydraulic motor which is interlocked with an endless screw.

In continuation, a roller 6 -FIG. 1- is started, a roller which should preferably be of rubber rotating clockwise as viewed in FIG. 1 or in such direction as to cause pulling of the fishing gear (not shown) aboard the boat. After this, the winches 5 are started up so that the nets are brought in, passing over the roller 6 through the tunnel 8 -FIG. 3- and another roller 26 -FIG. 1) until the fishing gear enters the winch and continues to rise constantly until it reaches the maximum point where the net poles (not shown) butt against a roller 26 -FIG. 1-. At this point, 25 metres of gear have been taken in, even though only a small boat may be involved in the operation; if the boat is larger, even more would have been hauled in, looping it at the height of a roller 6 and through further cables it would continue to be pulled in by the winch drums 27 and 28 -FIG. 4-until the bottom of the net, the part with the catch, is reached. If this is not too heavy, it will continue to be carried out. If, on the other hand, it holds a great deal of weight, it will be necessary to loop it and hoist it by the two-legged mast by means of the main tackle which is installed in the crosstree 30 -FIG. 3- and by means of the snatch blocks 16 -FIG. 1-.

As is known, these main tackles are made up of one snatch block in the crosstree which has two rollers and another which has only one roller, where the weight is engaged; by means, due to the reduction, much greater force is obtained, since the reduction is 3 or 4 to 1, according to how it is wished to use the main tackle.

The operation is carried out in the following manner: the net bottom is raised as much as possible by means of the roller 6. When it cannot be raised more because of the excessive weight, the gear is looped and it will then be raised by means of the main tackle through a snatch block 16 to this block. This action will be repeated as many times as may be necessary until the bottom of the net passes over the roller 6. The hatch cover 23 -FIG. 3- is opened, allowing the fish to fall to the main deck. This operation is performed when the fishing is done by trawling or by single-boat net fishing.

If the fishing is performed by a pair of boats, the operation of throwing out the fishing gear is the same, but since each boat drags only a single cable, the hook for towing 31 -FIG. 1- is made fast, the cable coming out over the davits 11 and 12 so that when the fishing gear is being hauled along, either one of the boats is able to manoeuvre freely. When the fishing gear is retrieved, one of the boats casts a rope to the other by which the other arm of the fishing gear is passed. Since, as we have already described and as can be seen in FIG. 3, the entire side of the boat is completely free, the other arm of the gear can be carried to the stern without any obstruction, in order to take it in, as we have described the operation previously, or as if the fishing were being done by trawling or with only one boat. When the gear is hoisted onto the deck aft, aided by the rotating roller, it will be passed through the previously mentioned tunnel 8 until it reaches the forward part of the boat at the height of the hatch covers. As can be seen, the length of gear that can be hoisted in at one time is much greater than that which can now be handled by the system of hauling in used by boats with ramps.

It can be seen in FIG. 3 that the tunnel 8 has doors both on the forward side 13 and aft 14 so that, in the event that it should be necessary, a closed area of some 30 metres of more can be created, with a variety of uses. One of them, for example, is the straightening out and rearranging of the fishing gear in the case of bad weather. By this means there will be protection against the elements whereas, in other boats, similar operations must be carried out in the open.

If due to bad weather or any other cause, it is wished to haul in the fishing gear by the lower deck, then it will be sufficient to pass the cables 7 by this deck, by means of the pulleys 15 and from them directly to the roller 6. Usually this deck of about 180 metres will be used in handling the fish, for quick freezing chambers, filleting machinery, and, in general, for whatever type of machinery it is wished to include. Within this area it will remain thoroughly protected. The great number of covered and fully sheltered metres of space protected from sea surge and inclement weather should be noted.

If, as we have said previously, the passage of the fishing gear requires looping it to the aft mast 22, the cable will be passed by a roller 9 and from there to the snatch blocks 16, located at the height of this mast.

In any one of these three cases, the person who operates the winches 5 will be able to see the operation directly. As we have said previously, these winches are located below the upper deck, but in such a way that if the person operating them is standing, his shoulders remain at the height of the upper deck 2.

If the operation of taking the net aboard is done by the upper deck, observation can be made flush with the deck and through the tunnel 8, and in the event of hauling in by means of the aft mast, as can be seen in FIG. 1, there is still a perfectly unobstructed line of sight from the location of the winches 5 over the command bridge, to the snatch block 16 at the top of the two-legged aft mast 21, by which means it is possible to have a perfect view of the net loop (when it arrives) at the point of maximum contact butted against the snatch block 16.

The positioning of the winches is within a cabin intended to protect the person operating them. For this purpose, the area will be protected behind, the part corresponding to the bow, by a washplate 19 and overhead by covers 20 which will protrude approximately one half metre above the upper deck. In the wall of the cabin which leaves us oriented toward the stern, doors 21 have been provided which fold down on the deck as their hinges are located on the upper edge of the deck 2. By this means, these doors can be opened upwards and remain parallel to this deck 2. When the weather is bad, naturally these doors should remain closed; for this reason, they are provided with windows which allow the required view.

The aft masts 22 are located at either side of the hatch cover 23 -FIG. 3- and almost at the bridge, leaving the opening of this free.

The davits 11 and 12 are mounted on pivoting axes 24 and 25 which permit them to revolve aft at a 270° angle, so that, swinging along the route indicated by the arrowheaded dashed lines of FIG. 3, they come to rest against the masts 22.

The application of this system allows fishing by trawling, by single boat, or by pairs of boats, since on lowering the nets, the doors and the cable (when it is a matter of trawling or single-boat fishing) is done from the stern, in the same way as when the fishing is done in pairs of boats, and the other arm of the fishing gear is given to the companion boat by passing it over the side without difficulty.

The setting out of the fishing gear is done in the following manner: a cable 7 which has the nets (not shown) hooked to it as well as the net doors (not shown) is made to pass out from the winches over the upper deck 2, sliding on rollers 26 then running aft along the upper deck and through the tunnel 8 by way of the rollers 9 until the davits are reached 11 and 12, even though the gear might be in the bow or the tunnel. By means of a turning mechanism (not shown) the cable is carried to a roller 6 which is started up so that it drops the gear into the sea, the nets and doors passing out (if the fishing is by trawling or single boat methods), the nets and cable if it is being done by pairs of boats.

In the event that the gear is snagged below, the operation of disentangling is easily carried out. Since there is no obstruction along the sides of the boat, it is possible to carry one of the cables forward by means of the rollers 32 and 33 -FIG. 3-; the operation can then be carried out from the bow, eliminating the danger of entangling the cable in the propeller, in the following manner: swinging the davit 12 outward, one of the cables is caught from the stern by the snatch block 10 -FIG. 1- and then carried by means of rollers 32 and 33 -FIG. 3- to the winch 5. The cable, which was aft before, is now in snatch block 10 over rollers 33, or, that is, in the bow. The boat may then position itself behind the fishing gear which has been caught sidewise of the boat and extending from the sea bottom and can attempt to get the gear out over the bow.

FIG. 2 is a detail of the construction of the command bridge 3, in which the placement of a life boat between the fishing operations cabin and the outside railing can be seen, and the free space that remains between the railing and the boat. Naturally, this detail is not an essential one and could be modified in any way.

FIG. 4 provides us with a view of the main deck where the placement of the winches and hatch covers is shown in more detail, as well as details of the location of the various compartments on this deck. In this drawing the amount of covered space which remains for work can be appreciated.

As for FIG. 5, which corresponds to the bulkhead deck with the holds, it shows us the arrangement of the holds with complementary details of the machine room, tanks for fuel and water storage, etc.

With the nature of the object of this application adequately described, it remains only to add that any kind of modification of form or detail can be introduced which does not alter the essential characteristics.

What is claimed is:

1. A fishing boat comprising:
    a. a hull having a bow and a stern, a lower main deck and an upper deck defining an interspace, said decks extending substantially from said bow to said stern,
    b. bridge means including transversely spaced apart side structures extending above said upper deck and defining a tunnel between them which extends generally fore and aft,
    c. winch means in the interspace between said decks near the bow of said boat,
    d. at least one power driven reversible roller means at the stern rotatable about an axis that is transverse to the boat,
    e. cable means coupled to and driven by said winch means, said cable means being extendable through alternate paths above and below said upper deck and over said stern roller means to enable passing fishing gear to and from said boat over said roller means.

2. The boat set forth in claim 1 wherein:
    a. said upper deck has an opening forward of said roller means,
    b. guide roller means for directing one cable from over said roller means through said opening and under said upper deck in said interspace, whereby to permit fishing gear pulled in over said roller means to be disposed fore and aft over a substantial part of the length of said lower deck.

3. The boat set forth in claim 2 wherein:
    a. said upper deck has a second opening near said winch means to provide a clear line of sight from proximity with said winch means through said tunnel to said stern and there being another clear line of sight toward said stern through said interspace and first opening.

4. The boat defined in claim 1 including:
    a. selectively openable and closeable door means at the fore and aft ends, respectively, of said tunnel to enable refining an enclosed space therein when said doors are closed.

5. The boat set forth in claim 1 wherein:

a. said bridge structure is located forward of said stern and aft of midship.

6. The boat set forth in claim 1 including:
   a. a pair of transversely spaced apart davits at said stern above said upper deck, said davits including arms which are swingable about nominally vertical axes,
   b. a snatch block means having pulley means and being supported on each davit arm,
   c. a set of roller means in said tunnel means and near the aft end thereof, and at least one more set of roller means substantially forward thereof,
   d. cable means in operative connection with said winch means and extending over said roller means sets to said snatch block means on said davit arms, respectively, said cable means ascending from said winch means to above said upper deck,
   e. said upper deck having an opening generally above said winch means to enable a clear line of sight over said upper deck, through said tunnel and to said davits.

7. The boat set forth in claim 6 including:
   a. aft masts extending upwardly from said upper deck between said transverse roller means on said stern and the aft side of said bridge structure,
   b. pulley means at the upwardly remote ends of said aft masts for engaging said cable to thereby raise fishing gear attached thereto for looping said gear on said upper deck while the operator of said winch is afforded a clear line of sight to said mast.

8. The boat set forth in claim 6 including:
   a. means for shifting said cable sidewise of said boat and means to redirect said cable from near the bow of said boat, whereby said boat may be propelled rearwardly without interference by said cable and fishing gear attached thereto in the event it is desired to reverse the boat for unsnagging the fishing gear.

9. A fishing boat comprising:
   a. a hull having a bow and a stern, a lower deck and an upper deck defining an interspace therewith, said decks extending substantially from said bow to said stern, said interspace and the space above said upper deck affording separate paths for running fishing gear handling cables along said boat between the forward and stern portions thereof,
   b. reversibly power driven stern roller means for taking in and paying out fishing gear relative to said boat, said roller means being rotatable on an axis transverse to said boat,
   c. bridge means above said upper deck including transversely spaced apart supporting structures defining a tunnel above said upper deck,
   d. said upper deck having an aft opening near and forward of said roller means and having another opening substantially forward and nearer the bow of the boat,
   e. winch means near said most forward opening,
   f. cable means and means for selectively directing a cable from said winch means through said interspace and out of said aft opening to said stern roller means and means for directing a cable through said tunnel to said stern roller means whereby to enable selectively laying fishing gear that is pulled in over said stern roller means on said upper deck or said lower deck.

10. The boat set forth in claim 9 wherein:
    a. said winch means is located between said upper and lower decks forward of said more forward opening, whereby an operator positioned near said winch means is afforded clear lines of sight toward said stern the first of which is through said interspace and the second of which is above said upper deck and through said tunnel.

11. The boat set forth in claim 10 wherein:
    a. said bridge means includes structures covering said supporting structures and said tunnel is provided with fore and aft doors to thereby define a protective enclosure.

* * * * *

UNITED STATES PATENT OFFICE
CERTIFICATE OF CORRECTION

Patent No. 3,797,432　　　　　　　Dated March 19, 1974

Inventor(s) Javier Rey Bermudez

It is certified that error appears in the above-identified patent and that said Letters Patent are hereby corrected as shown below:

On the title page, change the spelling of the inventor's name from "Mermudez" to---Bermudez---, both occurrences.

On the title page change the inventor's address from "Avda- Primo de Rineo" to---Avda. Primo de Rivera---.

Signed and sealed this 30th day of July 1974.

(SEAL)
Attest:

McCOY M. GIBSON, JR.　　　　　　　C. MARSHALL DANN
Attesting Officer　　　　　　　　　Commissioner of Patents